(12) United States Patent
Tanimura et al.

(10) Patent No.: US 6,495,109 B1
(45) Date of Patent: Dec. 17, 2002

(54) OZONE SUPPLYING APPARATUS

(75) Inventors: Yasuhiro Tanimura, Tokyo (JP); Junji Hirotsuji, Tokyo (JP); Shigeki Nakayama, Tokyo (JP); Hisao Amitani, Tokyo (JP); Hiroshi Yuge, Tokyo (JP); Tateki Ozawa, Tokyo (JP)

(73) Assignee: Mitsubishi Denki Kabushiki Kaisha, Tokyo (JP)

( * ) Notice: Subject to any disclaimer, the term of this patent is extended or adjusted under 35 U.S.C. 154(b) by 44 days.

(21) Appl. No.: 09/722,729

(22) Filed: Nov. 28, 2000

Related U.S. Application Data

(62) Division of application No. 09/111,184, filed on Jul. 8, 1998, now Pat. No. 6,228,331.

(30) Foreign Application Priority Data

Jul. 24, 1997 (JP) ............................................. 9-198438

(51) Int. Cl.⁷ .............................. B01J 19/08; B01J 19/12
(52) U.S. Cl. ............................. 422/186.07; 422/186.11; 422/186.2
(58) Field of Search ...................... 422/186.07, 186.2, 422/186.08, 186.09, 186.1, 186.11, 186.19

(56) References Cited

U.S. PATENT DOCUMENTS

| 6,054,102 A | 4/2000 | Tanimura et al. | |
| 6,083,464 A | 7/2000 | Tanimura et al. | |
| 6,228,331 B1 * | 5/2001 | Tanimura et al. | 422/186.12 |
| 6,315,962 B1 * | 11/2001 | Tanimura et al. | 422/186.07 |

* cited by examiner

Primary Examiner—Nam Nguyen
Assistant Examiner—Wesley A. Nicolas
(74) Attorney, Agent, or Firm—Oblon, Spivak, McClelland, Maier & Neustadt, P.C.

(57) ABSTRACT

An ozone supplying apparatus comprising an ozone generator for generating ozonized oxygen from raw material oxygen, an adsorption/desorption device for adsorbing and storing ozone from ozonized oxygen and desorbing the ozone, and an ozone desorbing means for desorbing the adsorbed and stored ozone for supply, the apparatus being arranged to return oxygen to the ozone generator after desorbing ozone therefrom by the adsorption/desorption device, and to desorb and supply ozone from the adsorption/desorption device, wherein the adsorption/desorption device includes a plurality ozone storing portions filled with an adsorbent, and a liquid storing portion for filling a temperature medium to an outer peripheral surface of the ozone storing portion.

7 Claims, 16 Drawing Sheets

OZONE SUPPLYING APPARATUS

This application is a Division of application Ser. No. 09/111,184 filed on Jul. 8, 1998, now U.S. Pat. No. 6,228,331.

BACKGROUND OF THE INVENTION

The present invention relates to an ozone supplying apparatus. More particularly, it relates to an ozone supplying apparatus for producing and storing ozone by using electricity which is capable of supplying stored ozone continuously or intermittently at specified ratios to an ozone consuming object.

There has been conventionally known an intermittent type ozone supplying apparatus for temporarily storing ozone which comprises the following components as shown in FIG. 15: an ozone generator 50, an oxygen supply source 51, a circulating blower 52, an adsorption/desorption tower 53 for temporarily storing generated ozone, a cooling source 54 for cooling the adsorption/desorption tower 53, a heating source 55 for heating the adsorption/desorption tower 53, a water flow ejector 56 for taking ozone out from the adsorption/desorption tower 53 through decompression and suction, and a group of switch valves 57a to 57g. The adsorption/desorption tower 53 is of double cylinder type as shown in FIG. 16, wherein an inner cylinder 58 is filled with an ozone adsorbent 59 and is further provided with a spiral heat transferring pipe 60 for heating (refer to Japanese Examined Patent Publication No. 64484/1985). A cooling piping 61 through which a cooling medium is made to flow is wound around an outer surface of the inner cylinder 58 in a spiral manner. On the other hand, an outer cylinder 63 is filled with a heating medium 62. Silica gel is generally used as the adsorbent 59, and ethylene glycol or alcohol group as the heating medium 62. Note that numeral 53a is an inlet of the heating medium 62 and 53b an outlet of the heating medium 62. The circulating blower 52, ozone generator 50 and adsorption/desorption tower 53 constitute, in this order, a single circulating system.

Operations will now be explained. There are two operations, namely an adsorbing operation and a desorbing operation of ozone.

The adsorbing operation will first be explained. Oxygen is supplied by the oxygen supply source 51 through an inlet 53c so that the pressure in the circulating system is always a constant pressure. At this time, the pressure is normally maintained at 1.5 kg/cm$^2$. When oxygen is made to flow in the circulating system by the circulating blower 52 while the switch valves 57c and 57d are in an opened condition, a part of the oxygen is converted into ozone through silent discharge to generate ozonized oxygen while passing through the discharge space of the ozone generator 50, and the ozonized oxygen is then transferred to the adsorption/desorption tower 53. The adsorbent in the adsorption/desorption tower 53 selectively adsorbs ozone, and the remaining oxygen is returned to the circulating blower 52 through the switch valve 57c. Oxygen which has been consumed as ozone is supplemented through the oxygen supply source 51. At this time, the temperature of the ozone adsorbent is cooled by the cooling source 54 to not more than −30° C. This is because the ozone adsorbing amount of the ozone adsorbent largely varies depending on the temperature. That is, by lowering the temperature, the ozone adsorbing amount increases and by raising the temperature, the ozone adsorbing amount decreases. Therefore, when adsorbing ozone, the adsorbent is cooled, and when desorbing ozone, the temperature of the adsorbent is raised.

When the adsorbent in the adsorption/desorption tower 53 has adsorbed ozone to approach the ozone saturation adsorption amount, the desorbing operation of ozone is performed. In the desorbing operation, operations of the ozone generator 50, the circulating blower 52 and cooling source 54 are terminated and the switch valves 57a to 57d are closed. Thereafter, the heating source 55 and water flow ejector 56 start their operations and switch valves 57e to 57g are opened. In order to enable easy desorption of ozone adsorbed at the adsorbent, heat of the heating medium 62 which has been injected from the heating source 55 through inlet 53a is applied from both the inner and outer surfaces of the inner cylinder 58 to raise temperature of the adsorbent 59. Then, by decompressing for sucking ozone in the adsorption/desorption tower 53 at one stroke to the outlet 53d through the water flow ejector 56, ozone is made to disperse and dissolve into water in the water flow ejector 56 which is then sent as ozone water to places where ozone is used. By decompression for suction, the achieved pressure in the adsorption/desorption tower 53 is made to be approximately 0.1 kg/cm$^2$ (absolute pressure). When the desorbing period is completed in this way, the process returns to the initial adsorbing operation and is continuously repeated.

A conventional intermittent type ozone supplying apparatus is disadvantaged in that, by increasing the amount of filled silica gel for storing a large quantity of ozone, time required for cooling silica gel is increased so that ozone can not be efficiently stored, and it is also disadvantaged in that, by increasing the number of arranged ozone adsorption/desorption towers, the installation area is increased or the operation of the apparatus becomes complicated. Further, since the heating source and cooling source are separately arranged, the apparatus is made complicated and maintenance of silica gel in the adsorption/desorption towers is made difficult.

The present invention has been made in view of the above circumstances, and it is an object of the present invention to provide an ozone supplying apparatus which is capable of shortening time required for cooling the ozone adsorbent, capable of efficiently storing ozone, and which can be arranged to be compact.

SUMMARY OF THE INVENTION

An ozone supplying apparatus according to the present invention comprises an ozone generator for generating ozonized oxygen from raw material oxygen, an adsorption/desorption device for adsorbing and storing ozone from ozonized oxygen and desorbing the ozone, and an ozone desorbing means for desorbing the adsorbed and stored ozone for supply, the apparatus being arranged to return oxygen to the ozone generator after desorbing ozone therefrom by the adsorption/desorption device, and to desorb and supply ozone from the adsorption/desorption device, wherein the adsorption/desorption device includes at least one ozone storing portion filled with an adsorbent, and a liquid storing portion for filling a temperature medium to an outer peripheral surface of the ozone storing portion.

The ozone storing portion might be arranged to be in the liquid storing portion.

The ozone storing portion might be made in a form of a pipe which is either of cylindrical or of conical shape.

The ozone supplying apparatus might further include an ozonized oxygen channel in which a distance for ozonized oxygen to flow in the ozone storing portion is longer than an average distance between a central point of the ozone storing portion and a surface thereof at the time of adsorbing ozone, and a distance for ozonized oxygen to flow in the ozone storing portion is shorter than the average distance between the central point of the ozone storing portion and the surface thereof.

An adsorbent to be filled into the ozone storing portion might be of an integrated type corresponding to a shape of the ozone storing portion and is of porous material.

The adsorption/desorption device might be disposed in a gas charging vessel for charging gas therein and a pressure adjusting means might be provided for adjusting a gas pressure in the gas charging vessel.

Gas pressure in the gas charging vessel might be made to be vacuum at the time of storing ozone.

A branching line might be formed in an ozone circulating line provided between the ozone generator and the adsorption/desorption device, and the branching line is connected to a gas aspirating means for aspirating gas in the adsorption/desorption device and a gas storing tank for temporarily storing gas therein.

An oxygen refining device might be provided between the gas aspirating device and the gas storing tank.

The ozone supplying apparatus might further include a temperature adjusting device for adjusting temperature in the adsorption/desorption device and a temperature measuring device for measuring a temperature in the adsorption/desorption device.

The adsorption/desorption device might be heated by the temperature adjusting device after completion of ozone desorption.

DETAILED DESCRIPTION OF THE INVENTION

Embodiment 1

Figure 1:
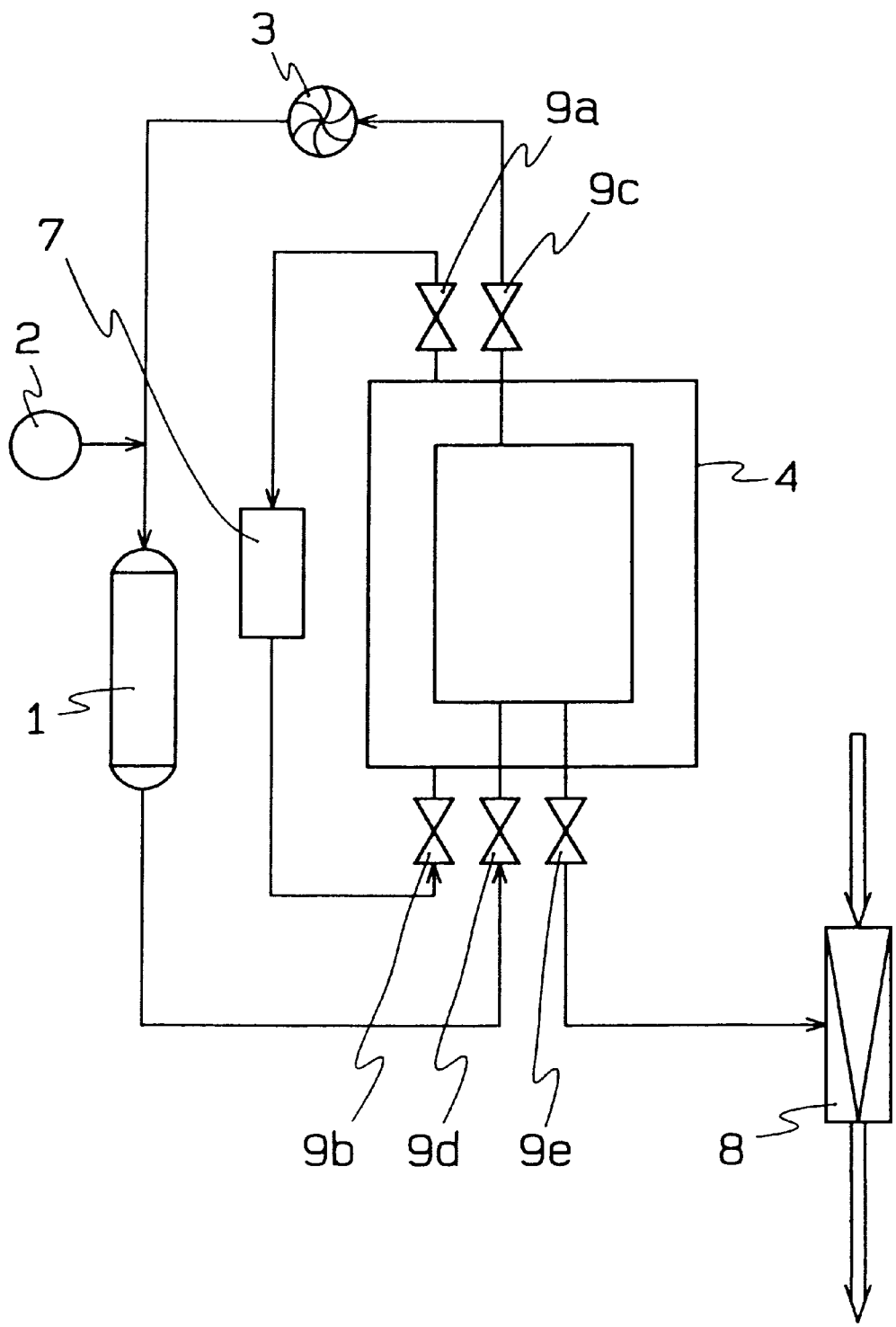
FIG. 1 is a diagram showing an arrangement of an ozone supplying apparatus according to Embodiment 1 of the present invention.
Figure 2:
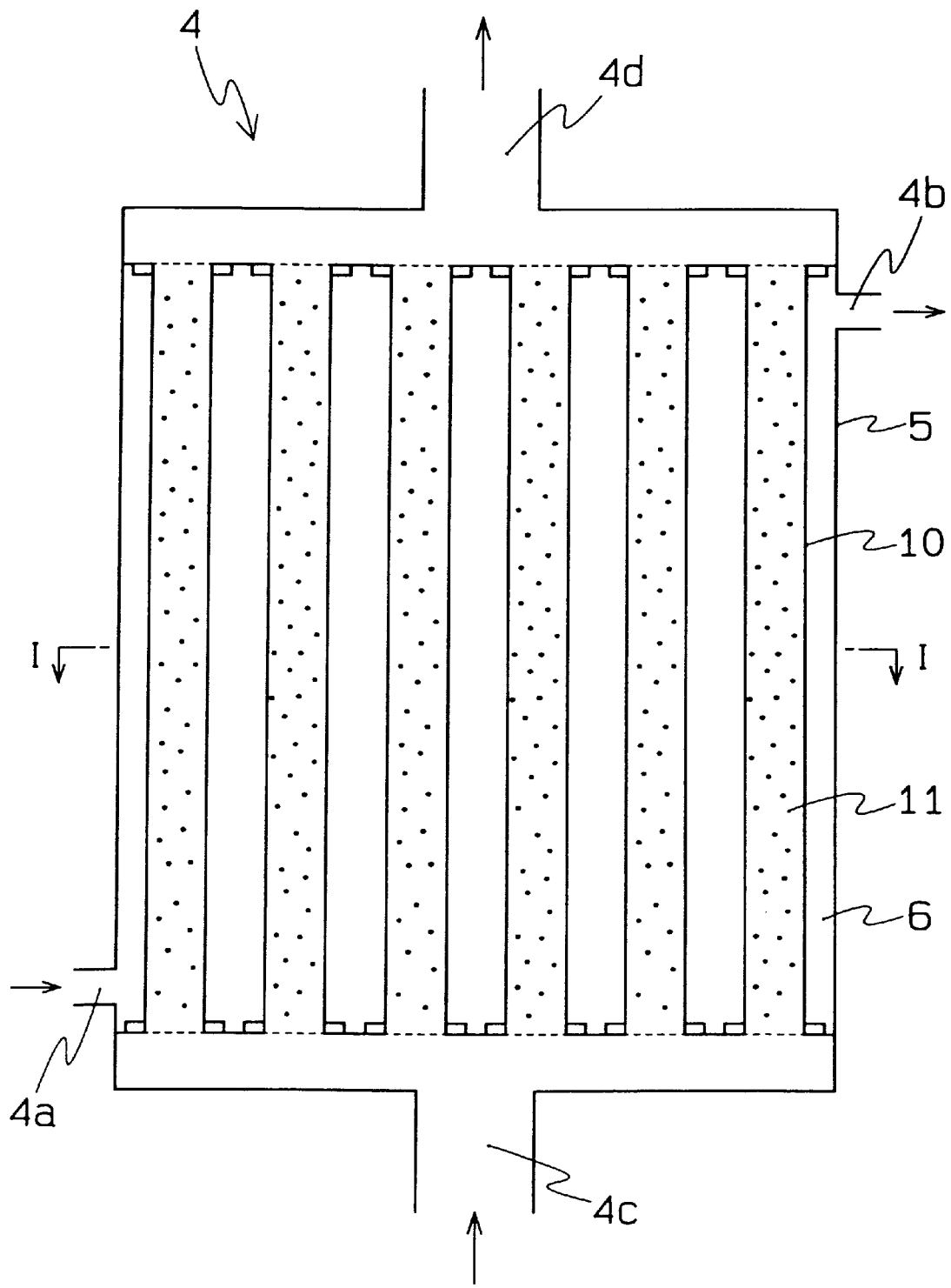
FIG. 2 is a diagram showing an arrangement of an ozone adsorption/desorption device in Embodiment 1 of the present invention.

FIG. 1 is a diagram showing an arrangement of an ozone supplying apparatus according to Embodiment 1 of the present invention, and FIG. 2 is a detailed diagram showing an ozone adsorption/desorption device in FIG. 1. Such an apparatus comprises, as shown in FIGS. 1 and 2, an ozone generator 1 for generating ozonized oxygen, an oxygen supply source 2, a circulating blower 3, an adsorption/desorption device 4 for temporarily storing the generated ozone, a temperature adjusting device 7 for adjusting temperature of a temperature medium 6 to be filled within a liquid storing portion which resides inside of an outer cylinder 5 in the adsorption/desorption device 4, a water flow ejector 8 which is an ozone desorbing means, and switch valves 9a to 9e. A plurality of adsorption/desorption tubes 10 as the ozone storing portion are disposed within the outer cylinder 5 of the adsorption/desorption device 4, and the inside of the adsorption/desorption tube 10 is filled with an adsorbent 11. The temperature medium for adjusting temperature of the adsorbent 11 flows an outer surface of the adsorption/desorption tube 10. It is preferable to select an adsorbent having a low decomposing rate when it comes into contact with ozone. For example, silica gel, activated alumina or porous materials impregnated with fluorocarbon can be employed. On the other hand, ethylene glycol or alcohol group might be used as the temperature medium 6. It should be noted that numerals 4a to 4d denote an inlet for temperature medium, an outlet for temperature medium, an inlet for ozonized oxygen, and an outlet for ozonized oxygen, respectively.

Operations of the apparatus will now be explained. There are two operations in total, namely zone adsorbing operation, and ozone desorbing operation.

The adsorbing operation will first be explained. Oxygen is supplied by the oxygen supply source 2 so that the pressure in the circulating system is always constant, for example 1.5 kg/cm². At this time, the higher the pressure in the circulating system becomes, the more efficiently ozone can be stored. However, in view of ozone generating efficiency and ozone storing efficiency, an excessive increase of pressure in the circulating system results in an increase in consumption of electricity at the time of storage so that it is desirable to maintain a pressure of about 5 kg/cm²G in maximum. When oxygen is made to flow in the circulating system by the circulating blower 3 while the switch valves 9a and 9c in an opened condition, a part of the oxygen is converted into ozone through silent discharge to generate an ozonized oxygen while passing through the discharge space of the ozone generator 1, and the ozonized oxygen is then transferred to the adsorption/desorption tubes 10. The adsorbent in the adsorption/desorption tubes 10 selectively adsorbs ozone, and the remaining oxygen is returned to the circulating blower 3 through the switch valve 9c. Oxygen which has been consumed as ozone is supplemented through the oxygen supply source 2. Since the adsorbent assumes a property that adsorption capacity of ozone increases if the adsorbent is cooled more, the cooling temperature is generally. maintained by the temperature adjusting device 7 to not more than −40° C.

When the adsorbent in the adsorption/desorption tube 10 has adsorbed ozone to approach the ozone saturation adsorption amount, the desorbing operation is performed. In the desorbing operation, operations of the ozone generator 1 and the circulating blower 3 are terminated and switch valves 9a to 9d are closed. Thereafter, the water flow ejector 8 starts its operation and the switch valve 9e is opened. At this time, the temperature medium 6 is heated by the temperature adjusting device 7 and the temperature medium 6 is applied from the outside of the adsorption/desorption tube 10 to raise the temperature of the adsorbent 11. By decompressing for sucking ozone in the adsorption/desorption device 4 by the water flow ejector 8, ozone is made to disperse and dissolve into water in the water flow ejector 8 and is supplied as ozone water to places where ozone is used. At this time, the achieved pressure in the adsorption/desorption tubes 10 by decompression for suction is approximately 0.1 kg/cm² (absolute pressure). When the desorbing period is completed in this manner, the process returns to the initial adsorbing process which is continuously repeated. It should be noted that the desorbing process might alternatively be started when ozone of a specified density starts to leak out from the adsorption/desorption device 4.

Figure 3:
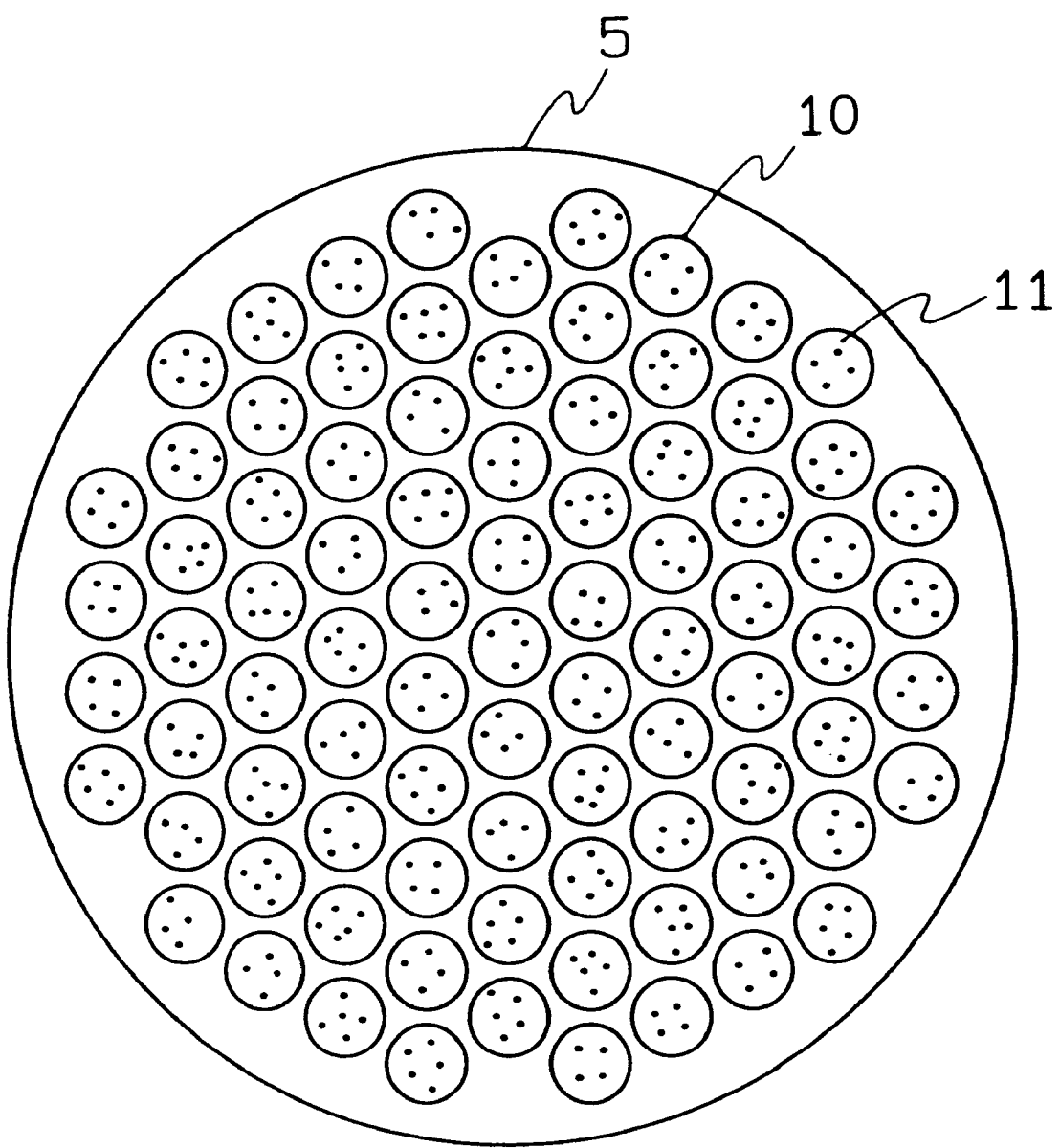
FIG. 3 is a sectional diagram taken along the line I—I showing the ozone adsorption/desorption device in Embodiment 1 of the present invention.

FIG. 3 is a sectional diagram taken along the line I—I of the adsorption/desorption device. As shown in FIG. 3, by providing a plurality of adsorption/desorption tubes 10 filled with adsorbent 11 in the interior of the outer cylinder 5, ozone can be efficiently adsorbed to a small space of the outer cylinder 5.

Figure 4:
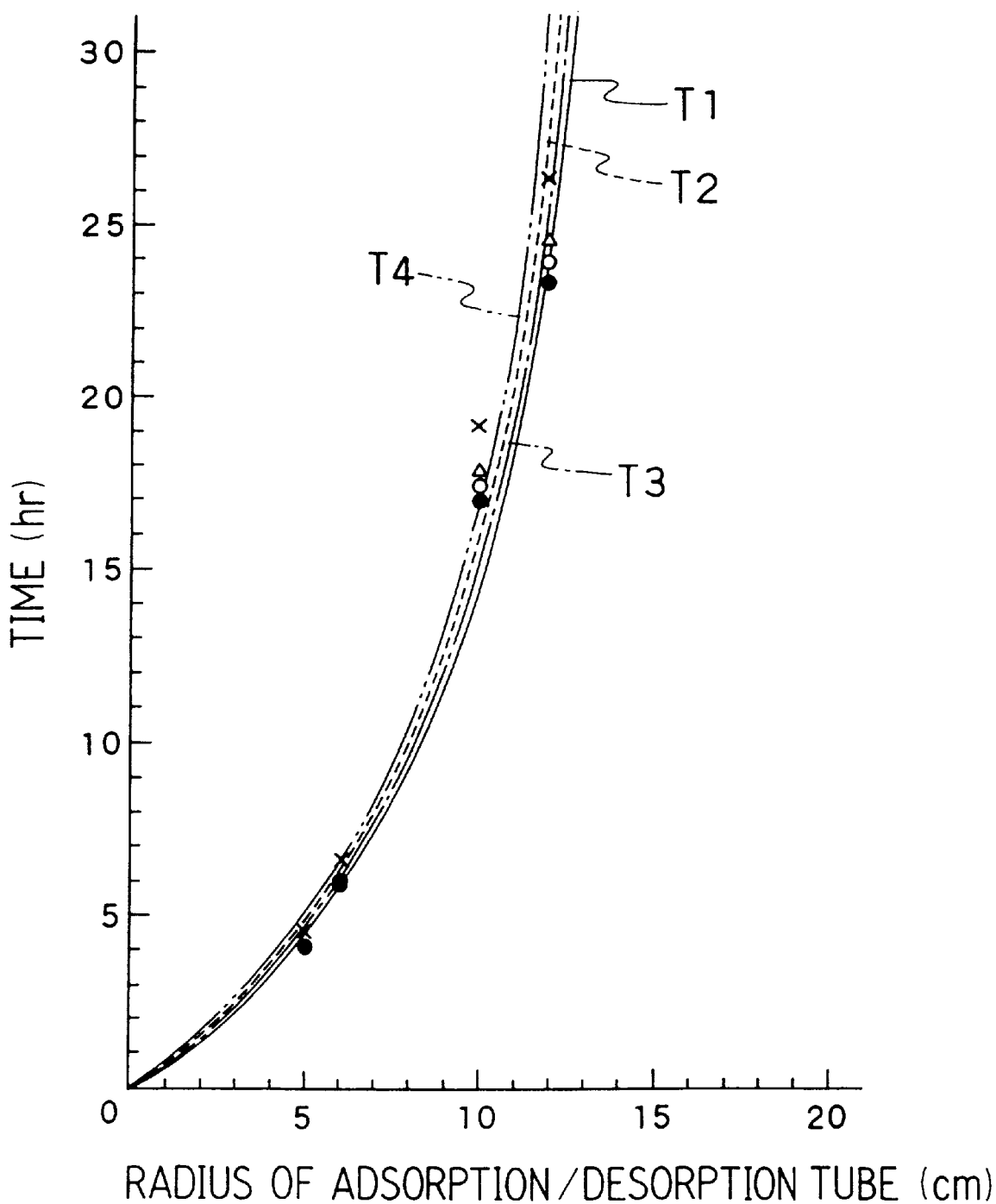
FIG. 4 is a diagram showing a relationship between a radius of an adsorption/desorption tube and a cooling time.

FIG. 4 is a diagram showing a relationship between a radius of the adsorption/desorption tube and a time in which a temperature in the central portion of the adsorption/desorption tubes filled with an adsorbent reaches a target set temperature (T1=−20° C., T2=−40° C., T3=−60° C., T4=−80° C.). As shown in FIG. 4, the larger the radius of the adsorption/desorption tube becomes, the more the cooling time increases exponentially. It can thus be understood therefrom that it is important to make the radius of the adsorption/desorption tubes as small as possible in order to efficiently store ozone. It can also be understood that differences in cooling time due to differences in the target set temperatures are small and thus the cooling time is almost dependent on the radius of the adsorption/desorption tubes. Therefore, when supplying ozone once a day, the cooling time needs to be set to less than 24 hours in maximum so that it is desirably to set the radius of the adsorption/desorption tubes to not more than 12 cm.

Figure 5:
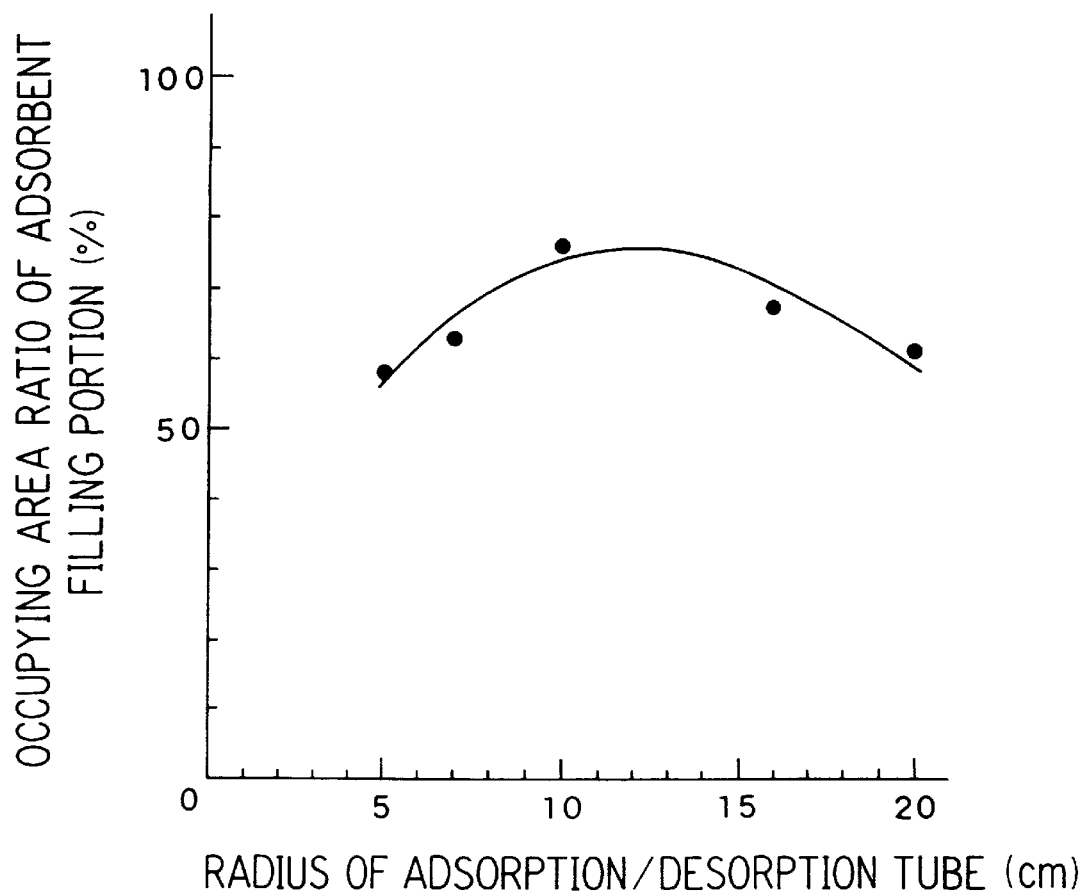
FIG. 5 is a diagram showing a relationship between a radius of an adsorption/desorption tube and an occupying area ratio of an adsorbent filling portion.

FIG. 5 is a diagram showing a relationship between the radius of the adsorption/desorption tubes and an occupying area ratio of the adsorbent filling portion in the outer cylinder. It can be understood that the occupying area ratio increases with a decrease in radius when the radius of the adsorption/desorption tube is approximately in the range between 20 cm to 10 cm, and when the radius is smaller than 10 cm, the occupying area ratio decreases due to influence of a thickness of the adsorption/desorption tubes. Thus, it is preferable to set the radius of the adsorption/desorption tubes to 5 to 20 cm in view of securing a filling amount of silica gel.

Based on the relationship of FIGS. 4 and 5, it is considered that a preferable range for the radius of the adsorption/desorption tubes is approximately 5 to 10 cm for efficiently storing ozone. With this arrangement, the arrangement of the adsorption/desorption device can be simplified to decrease manufacturing costs thereof. Further, the provision of detachable adsorption/desorption tubes enables easy exchange of silica gel whereby maintenance can be improved.

While the present embodiment has been explained by taking a case in which the temperature medium 6 is heated by the temperature adjusting device 7 at the time of desorption, ozone might also be desorbed by terminating the temperature adjusting device 7 to cease control of temperature for the temperature medium 6 and decompressing for sucking ozone in the adsorption/desorption device 4 by the water flow ejector 8. With this arrangement, the amount of energy required at the time of desorption can be decreased to obtain an ozone supplying apparatus of power-saving type.

While the present embodiment has been explained by taking a case in which a water flow ejector 8 is employed at the time of desorption, equivalent effects can be obtained by employing a gas ejector or an aspiration pump.

Embodiment 2

Figure 6:
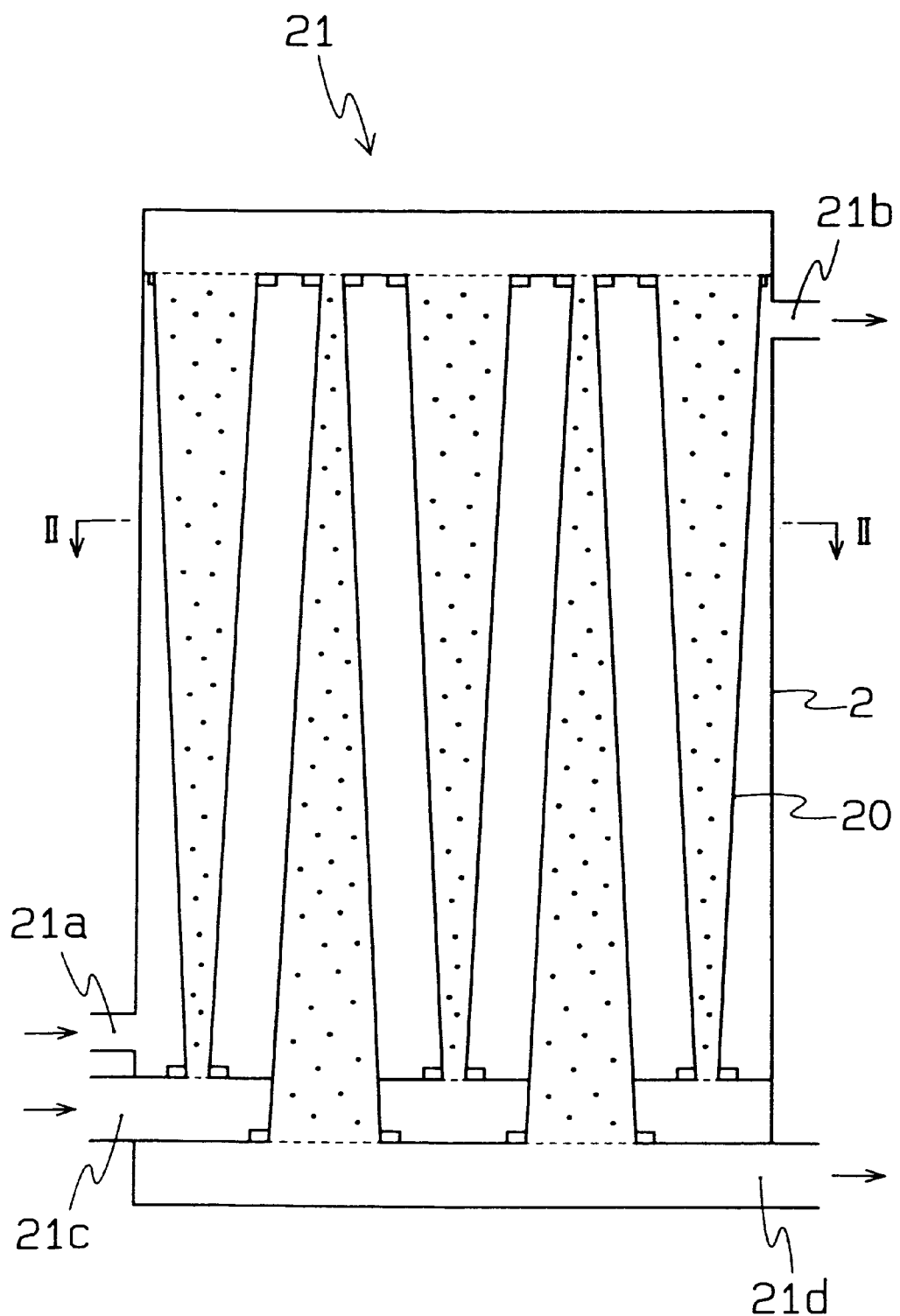
FIG. 6 is a diagram showing an arrangement of an ozone adsorption/desorption device in Embodiment 2 of the present invention.
Figure 7:
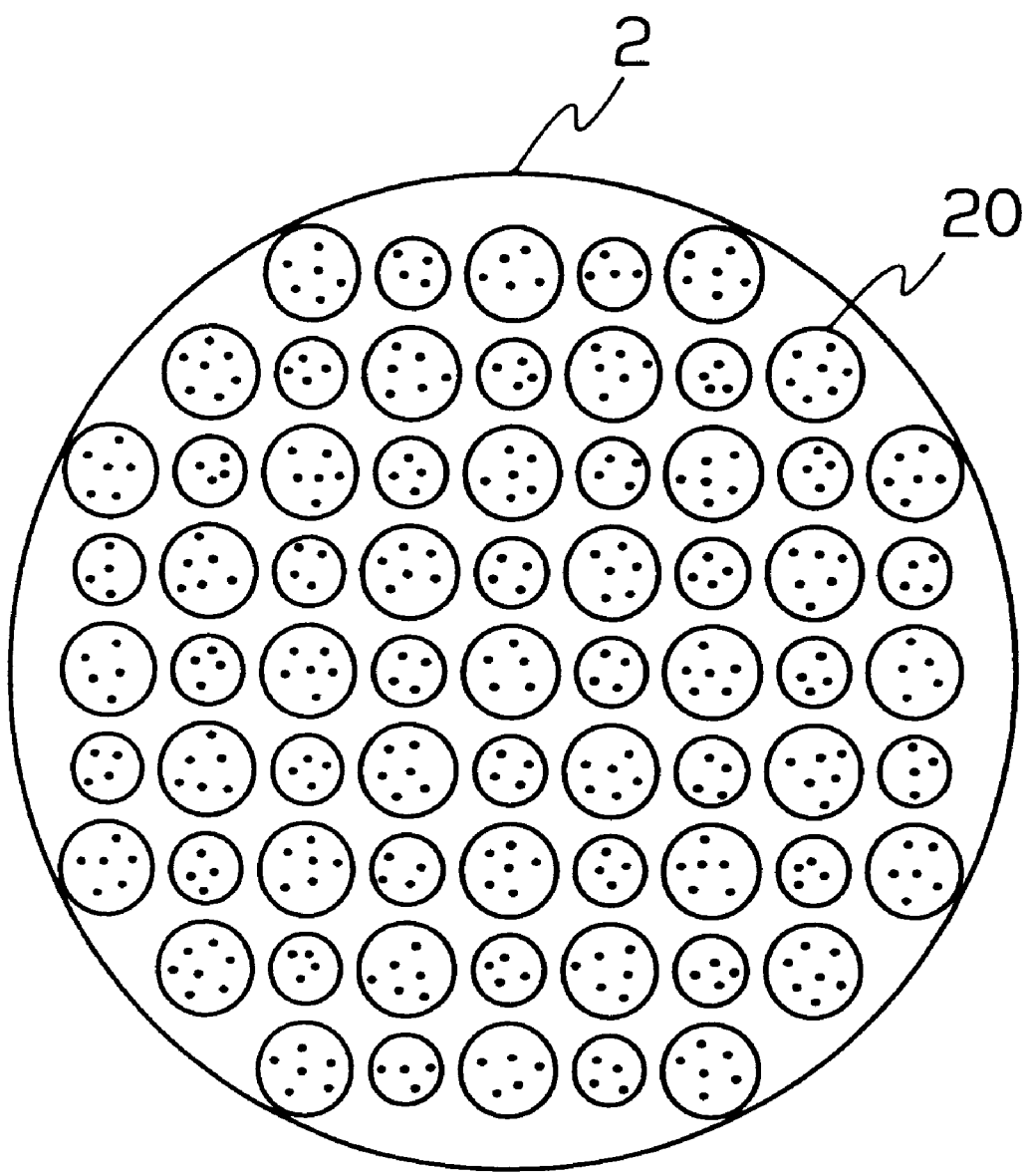
FIG. 7 is a sectional diagram taken along the line II—II showing the ozone adsorption/desorption device in Embodiment 2 of the present invention.

While Embodiment 1 has been explained by taking a case in which the adsorption/desorption tube is of cylindrical shape and in which a plurality of adsorption/desorption tubes 10 are arranged in the outer cylinder, the apparatus might be alternatively arranged as shown in FIG. 6 wherein adsorption/desorption tubes 20 are of conical trapezoid shape of which wide opening sides and narrow opening sides are alternately arranged. FIG. 7 is a sectional diagram taken along the line II—II of adsorption/desorption device 21 of the present embodiment. In the adsorption/desorption device 21 of the present embodiment, a cooled temperature medium 6 is made to pass through an inlet 21a to an outlet 21b at the time of adsorbing ozone and ozonized oxygen is made to flow through inlet 21c to flow into adsorption/desorption tube 20 from a narrow opening side in the bottom portion of the ozone storing device 21, to be released from a wide opening side in the top portion, to flow into the adsorption/desorption tube 20 again through a narrow opening side on the top portion and to be released from an outlet 21d in the bottom portion. By performing adsorption in this manner, the adsorbent can be first cooled to its central portion in a proximity of the side of the inlet 21c for the ozonized gas and a cavity speed (a speed at which ozonized gas moves through the adsorption/desorption tube) in the side of the outlet 21d for the ozonized gas can be made slow, whereby ozone can be efficiently adsorbed.

On the other hand, at the time of desorbing ozone, stored ozone is taken out by making it flow from the wide opening side to the narrow opening side, opposite to the flow of ozonized gas as described before. At this time, ozone might also be desorbed by connecting the adsorption/desorption tubes 20 in a serial manner, similarly to the adsorbing process, or might be alternatively desorbed by taking out ozone from gas aspirating openings in a top portion without connecting them in a series but separating the narrow and wide openings (and closing the narrow openings) and then taking out ozone from an aspirating opening in the bottom portion. By performing desorption in this manner, an amount of re-adsorbing ozone can be decreased. It should be noted that the arrangement in which adsorption/desorption tubes are not connected in a serial manner results in a further decrease in a contact amount of the adsorbent and ozone, whereby desorbing effects can be improved.

Embodiment 3

Figure 8:
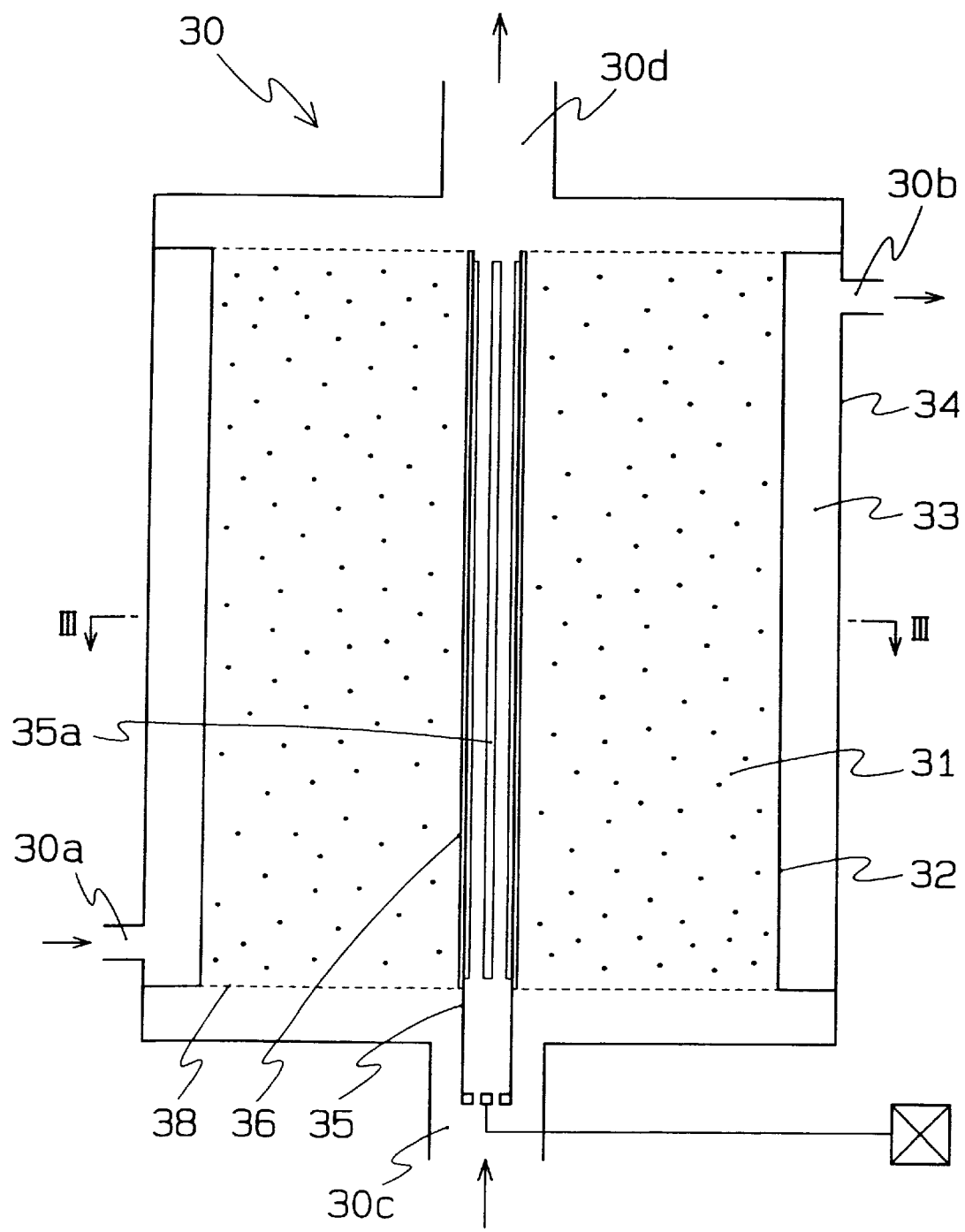
FIG. 8 is a diagram showing an arrangement of an ozone adsorption/desorption device in Embodiment 3 of the present invention.
Figure 9:
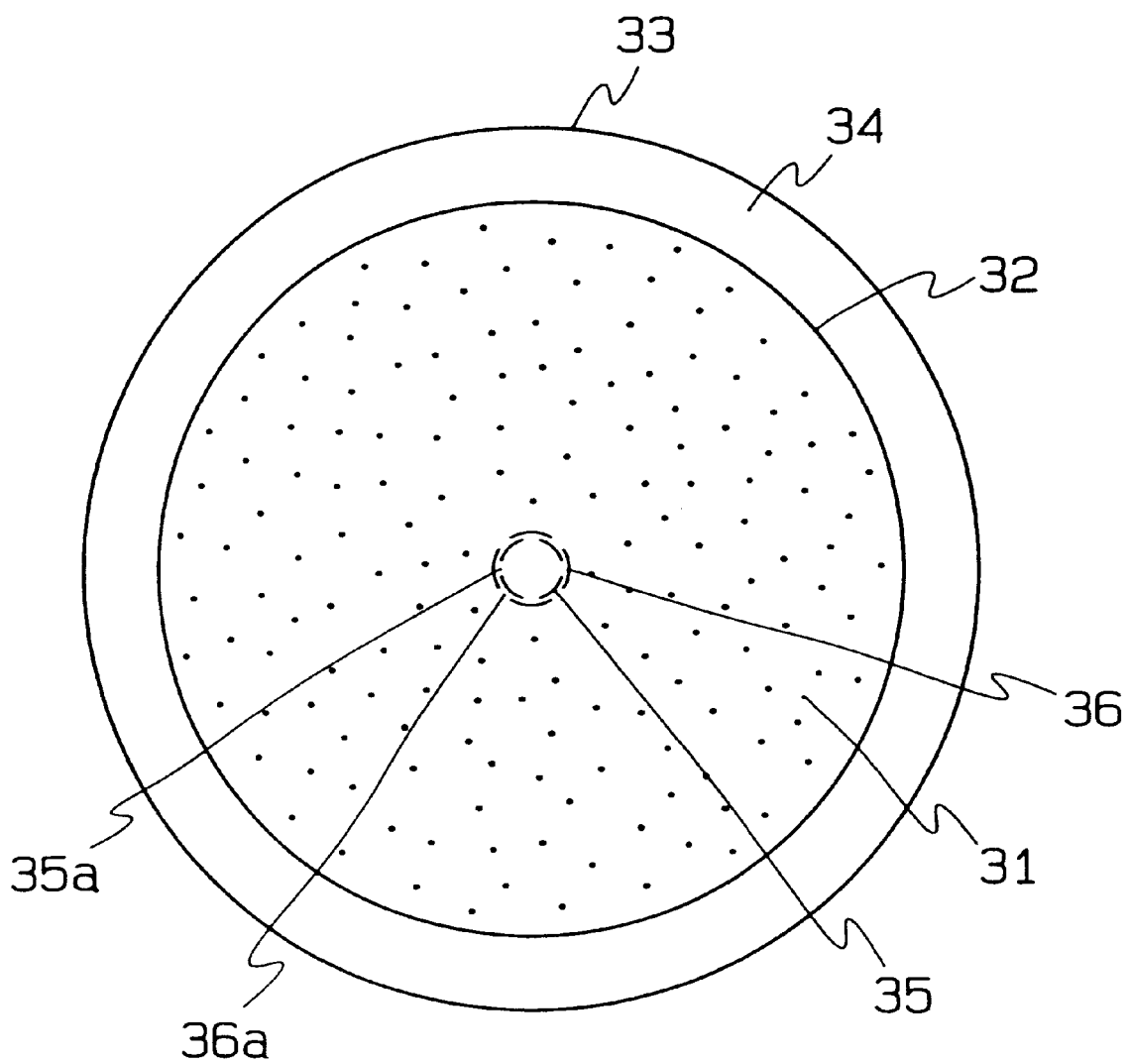
FIG. 9 is a sectional diagram taken along the line III—III showing the ozone adsorption/desorption device in Embodiment 3 of the present invention.

FIG. 8 is a diagram showing an ozone adsorption/desorption device 30 which is a major part of the ozone supplying apparatus according to Embodiment 3 of the present invention. In FIG. 8, numeral 31 denotes an adsorbent for temporarily storing generated ozone, 32 an inner cylinder for storing the adsorbent 31, 33 a temperature medium for adjusting temperature of the ozone adsorbent 31 included in the inner cylinder 32, 34 an outer cylinder through which the temperature medium 33 flows, 35 an ozone channel tube through which ozonized oxygen flows at the time of desorbing ozone, 36 a channel cover which is attached closely to the outer surface of the ozone channel tube 35, 37 a motor for rotating the ozone channel tube 35, and 38 a mesh for supporting the adsorbent. FIG. 9 is a sectional diagram taken along the line III—III of the adsorption/desorption device 30. As shown in FIG. 9, when performing desorption, an opening 36a provided in the channel cover 36 and an opening 35a provided in the ozone channel tube 35 are made to coincide by rotating the ozone channel tube 35 by the motor 37, and ozonized oxygen is made to flow to the opening 35a of the ozone channel tube 35 located in the central portion of the inner cylinder 32.

Operations will now be explained. There are two operations, namely an adsorbing operation and a desorbing operation of ozone. However, since operations which are performed until ozonized oxygen reaches an inlet 30c of the adsorption/desorption device 30 are identical with those of the previous Embodiment 1, explanations thereof will be omitted here.

Ozonized oxygen which has reached the adsorption/desorption device 30 is introduced from the inlet 30c in the bottom surface side into the adsorption/desorption device 30. Ozonized oxygen which has been supplied to the interior of the adsorption/desorption device 30 is supplied to the adsorbent 31 by passing through a mesh 38. At this time, the opening 35a of the ozone channel tube 35 is closed by the channel cover 36 so that ozonized oxygen can be prevented from being supplied to the adsorbent 31 via the opening 35a of the ozone channel tube 35. Oxygen gas which has not been adsorbed is discharged from outlet 30d in the top portion and returned, as shown in FIG. 1, to the circulating blower 3 via the switch valve 9c, and oxygen which has been consumed as ozone is supplemented by the oxygen supply source 2. By the temperature medium 33 flowing from the inlet 30a to the outlet 30b, the adsorbent 31 is cooled to be not more than −40° C.

When the adsorbent 31 in the inner cylinder 32 has adsorbed ozone to approach the ozone saturation adsorption amount, the desorbing operation is performed. In the desorbing operation, operations of the ozone generator 1, circulating blower 3 and temperature adjusting device 7 are terminated and switch valves 9a to 9d are closed. The ozone channel tube 35 is then rotated by the motor 37 and the opening 35a of the ozone channel tube 35 which has been closed by the channel cover 36 is made to be open. Thereafter, the water flow ejector 8 starts operation and switch valve 9e is opened. When the pressure in the inner cylinder 32 decreases, ozone which has been adsorbed at the adsorbent 31 in the inner cylinder 32 flows into the ozone channel tube 35 through the opening 35a thereof by the coincidence of the opening 36a provided in the channel cover 36 and the opening 35a of the ozone channel tube 35, and ozone is made to disperse and dissolve into water in the water flow ejector 8 and is supplied as ozone water to places where ozone is used. At this time, the achieved pressure in the inner cylinder 32 by the decompression for suction is approximately 0.1 kg/cm² (absolute pressure). When the desorbing period is completed in this manner, the process returns to the initial adsorbing process which is continuously repeated.

It should be noted that the desorbing process might alternatively be started when ozone of a specified density starts to leak out from the adsorption/desorption device 30. Further, in order to enable easy desorption of ozone adsorbed at the adsorbent 31, desorption of ozone might be performed by heating the temperature medium 33 through the temperature adjusting device 7. It is also possible to employ a gas ejector or an aspiration pump instead of the water flow ejector 8.

The adsorption/desorption device 30 is generally of columnar shape of which height is exceeding its diameter in order to make the installation area thereof as small as possible. As explained in this embodiment, ozonized oxygen is made to flow in a height direction at the time of adsorption and in a radial direction at the time of desorption, whereby the time of ozone adsorbing and breaking-through (leaking out) can be delayed in the adsorbing process and the amount of desorbed ozone which is re-adsorbed to the adsorbent can be decreased in the desorbing process. That is, by making a distance for ozonized oxygen to flow in the ozone storing portion longer than an average distance between a central point of the ozone storing portion and the surface thereof at the time of ozone adsorption, and by making the distance for ozonized oxygen to flow in the ozone storing portion shorter than the average distance between the central point of the ozone storing portion and the surface thereof, ozone can be efficiently adsorbed and desorbed.

Embodiment 4

Figure 10:
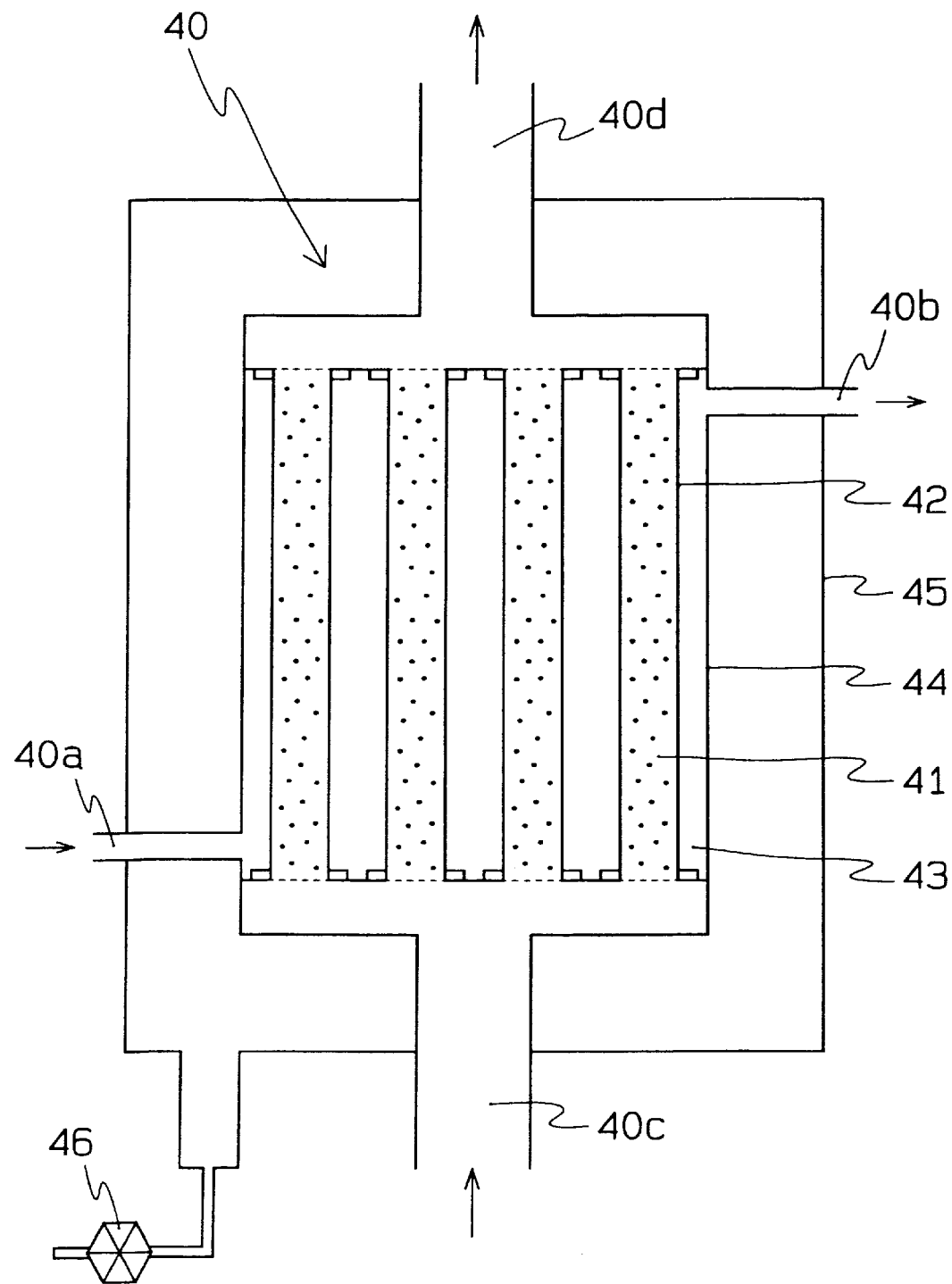
FIG. 10 is a diagram showing an arrangement of an ozone adsorption/desorption device in Embodiment 4 of the present invention.

FIG. 10 is a diagram showing an ozone adsorption/desorption device 40 which is a major part of the ozone supplying apparatus according to Embodiment 4 of the present invention. In FIG. 10, 41 denotes an adsorbent for temporarily adsorbing generated ozone, 42 adsorption/desorption tubes for storing the adsorbent 41, 43 a temperature medium for adjusting the temperature of the ozone adsorbent 41 included in the adsorption/desorption tubes 42, 44 an outer cylinder through which the temperature medium 43 flows, 45 an adiabatic vessel which is a charging vessel for charging gas and preventing heat diffusion from the outer cylinder 41 through which the temperature medium flows, 46 an adjuster which is a pressure adjusting means for adjusting a gas pressure in the adiabatic vessel 45. The adsorption/desorption device 40 of this embodiment is provided in the adiabatic vessel 45.

Operations will now be explained. There are two operations, namely an adsorbing operation and a desorbing operation of ozone. However, since operations which are performed until ozonized oxygen reaches inlet 40c of the adsorption/desorption device 40 are identical with those of the previous Embodiment 1, explanations thereof will be omitted here.

Ozonized oxygen which has reached the adsorption/desorption device 40 is introduced into the adsorption/desorption device 40 from an inlet 40c on the bottom face side. At this time, the pressure in the adiabatic vessel 45 is made to be in a vacuum state (not more than $10^{-4}$ torr) by the pressure adjuster 46 and the temperature of the adsorbent 41 in the adsorption/desorption tubes 42 is adjusted by the temperature medium 43 of which temperature is adjusted by the temperature adjusting device 7. Thereafter, ozonized oxygen which is supplied into the adsorption/desorption device 40 is supplied to the adsorbent 41 in the adsorption/desorption tubes 42. Oxygen gas which has not been adsorbed is discharged from outlet 40d in the top portion and is returned to the circulating blower 3 via the switch valve 9c. Oxygen which has been consumed as ozone is supplemented by the oxygen supply source 2.

When the adsorbent 41 in the adsorption/desorption tubes 42 has adsorbed ozone to approach the ozone saturation adsorption amount, the desorbing operation is performed. In the desorbing operation, operations of the ozone generator 1, circulating blower 3 and temperature adjusting device 7 are terminated and switch valves 9a to 9d are closed. The pressure in the adiabatic vessel 45 is raised by the pressure adjuster 46. While it is desirable to make the pressure in the adiabatic vessel 45 as high as possible at this time, the pressure in the adiabatic vessel 45 is set to 2 to 3 kg/cm$^2$ because manufacturing costs will increase when its pressure-proof performance is improved. Then, ozone in the adsorption/desorption device 40 is decompressed for suction by the ejector 8 and ozone is made to disperse and dissolve into water in the water flow ejector 8 and is supplied as ozone water to places where ozone is used. At this time, the achieved pressure in the adsorption/desorption tube 42 by the decompression for suction is approximately 0.1 kg/cm$^2$ (absolute pressure). When the desorbing period is completed in this manner, the process returns to the initial adsorbing process which is continuously repeated. It should be noted that the desorbing process might alternatively be started when ozone of a specified density starts to leak out from the adsorption/desorption device 40.

With the arrangement of this embodiment, the heat dispersing amount from the outer cylinder 44 can be decreased to efficiently perform cooling of the adsorbent 41 at the time of adsorption while the heat dispersing amount from the outer cylinder 44 can be promoted to efficiently raise the temperature of the adsorbent 41 at the time of desorption, whereby an ozone supplying apparatus of energy-saving type compared to conventional apparatuses can be obtained.

While the present embodiment has been explained by taking a case in which a plurality of adsorption/desorption tubes 42 are provided, equivalent effects can be obtained by using a single adsorption/desorption tube. It is also possible to employ a gas ejector or an aspiration pump instead of a water flow ejector. Further, while the present embodiment has been explained by taking a case in which the pressure in the adiabatic vessel 45 at the time of desorption is set to approximately 2 to 3 kg/cm$^2$, operation of the pressure adjuster might be terminated to return the pressure to an atmospheric pressure. In this case, the heat dispersing efficiency somewhat decreases, but since the pressure adjuster 46 for applying pressure to the adiabatic vessel 45 can be omitted, the ozone supplying apparatus can be manufactured at low cost.

Embodiment 5

Figure 11:
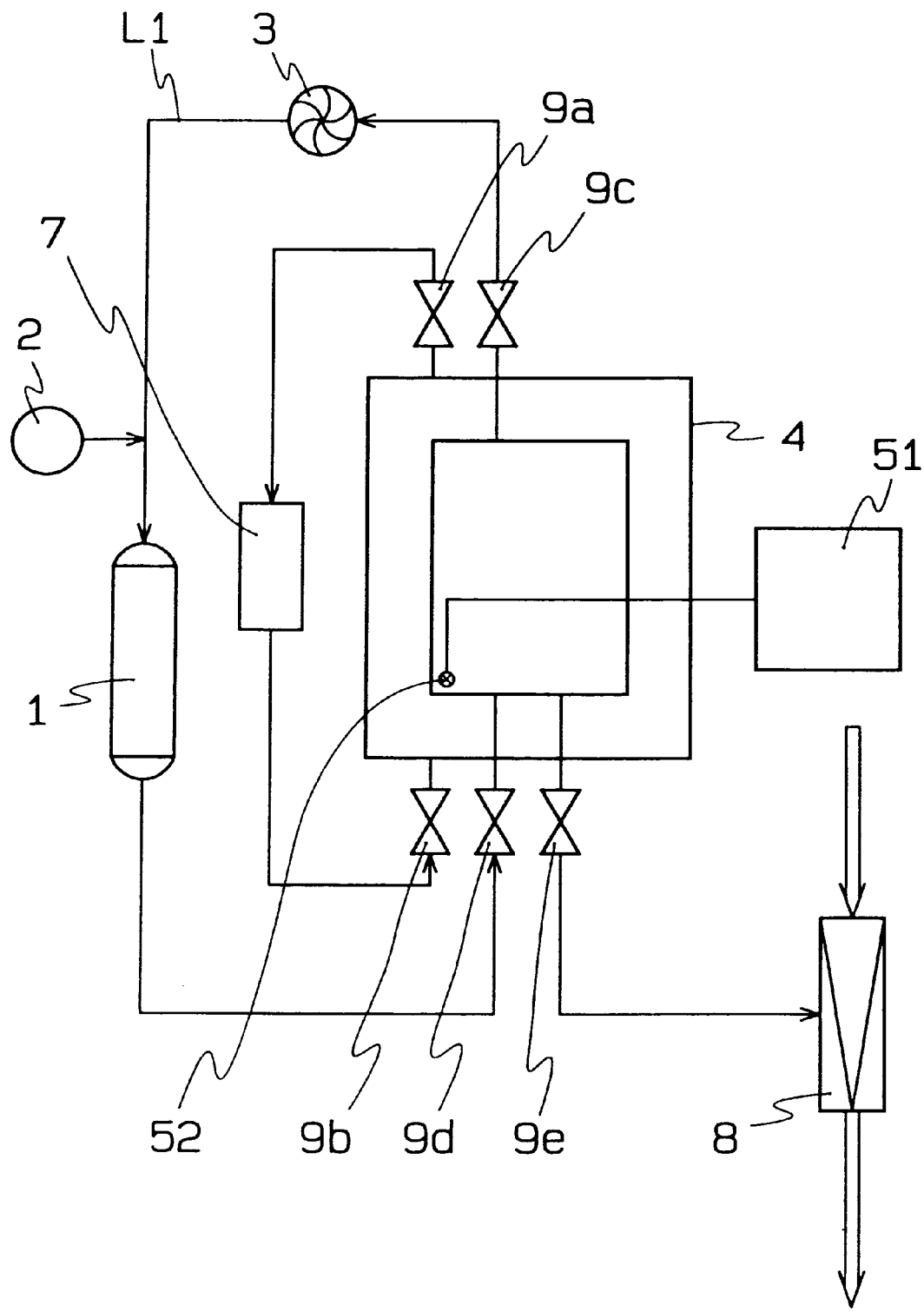
FIG. 11 is a diagram showing an arrangement of an ozone supplying apparatus according to Embodiment 5 of the present invention.

FIG. 11 is a diagram showing an ozone supplying apparatus according to Embodiment 5 of the present invention. In FIG. 11, numerals which are identical with those of the previous Embodiment 1 indicate identical or equivalent portions and explanations thereof will be omitted.

In this embodiment, the apparatus is provided with a temperature adjusting device 51 for adjusting temperature in the adsorption/desorption device 4 and a temperature sensor 52 which is either a contact type or non-contact type temperature measuring device for measuring a temperature of the adsorbent in the adsorption/desorption device 4. It should be noted that the temperature sensor 52 is disposed in a proximity of the inlet 4a for the temperature medium and is capable of measuring temperature of the absorbent 11 which is disposed in the proximity of the wall surface in the adsorption/desorption tube 10.

Operations will now be explained. There are two operations, namely an adsorbing and desorbing operation of ozone. However, since ozonized oxygen supplying operation to the adsorption/desorption device 4 and ozonized oxygen discharging operation from the adsorption/desorption device 4 are identical with those of the previous Embodiment 1, explanations thereof will be omitted, and only temperature controlling methods of the adsorption/desorption device 4 at the time of adsorption and desorption will be described.

The temperature controlling method at the time of adsorption will first be explained. At the time of adsorbing ozone, it is important to decrease temperature of the adsorbent in a short time. The set temperature for the temperature medium is set to a temperature which is lower than a target temperature which the adsorbent is to reach at last, that is, when the target temperature is −60° C., the set temperature is set to −70° C. which is lower than −60° C. This temperature medium is then supplied to the adsorption/desorption device 4 from the inlet 4a for the temperature medium. The temperature of the adsorbent in the proximity of the wall surface is observed by the temperature sensor 52, and when this temperature has reached the set temperature, the temperature of the temperature medium is set to approach the target temperature by units of several ° C. By repeating this operation, the temperature of the temperature medium is set to be the target temperature at last. By performing such control of temperature, the temperature of the adsorbent can be cooled in a short time.

Figure 12:
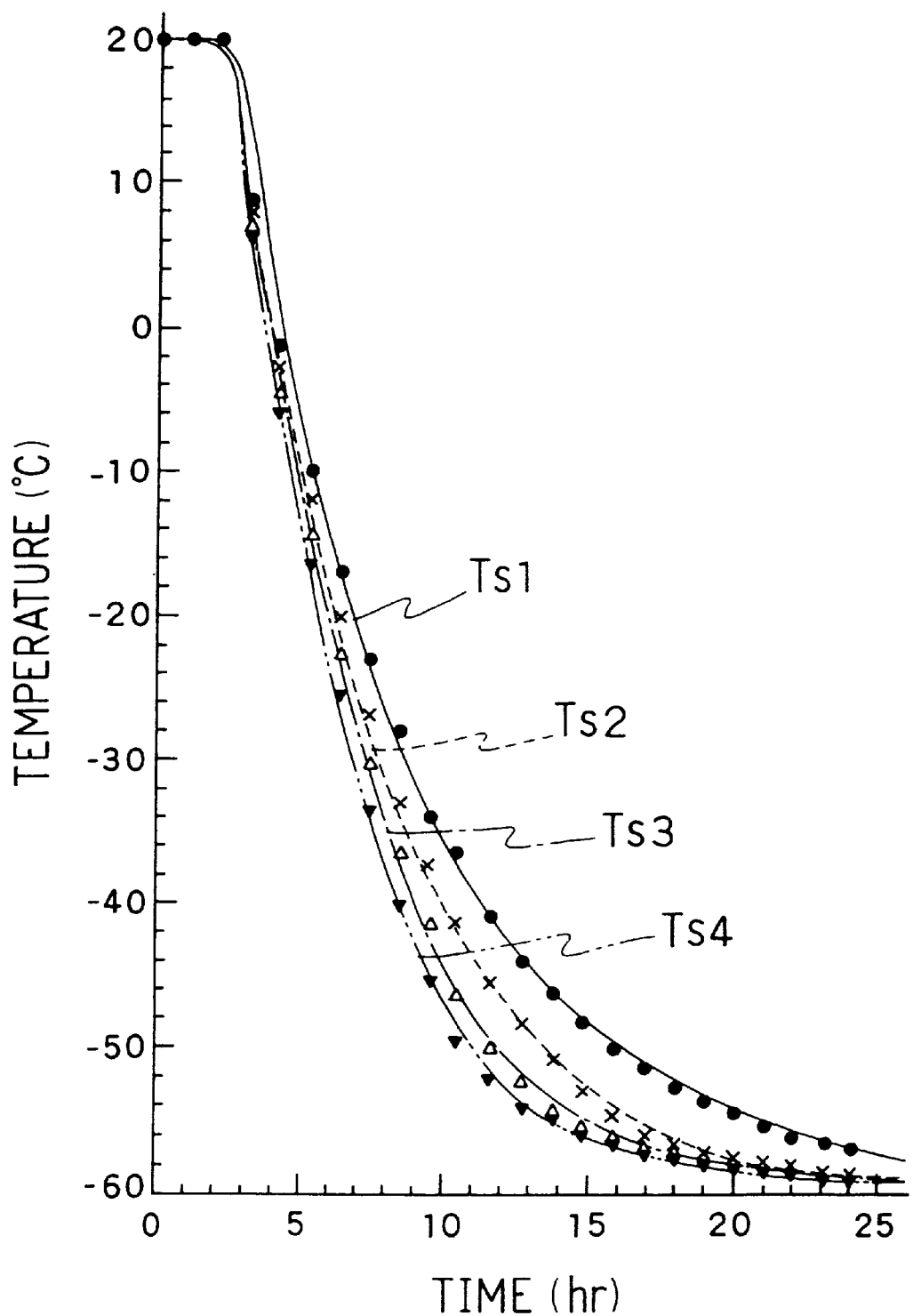
FIG. 12 is a diagram showing a relationship between a cooling time and a cooling temperature.
Figure 13:
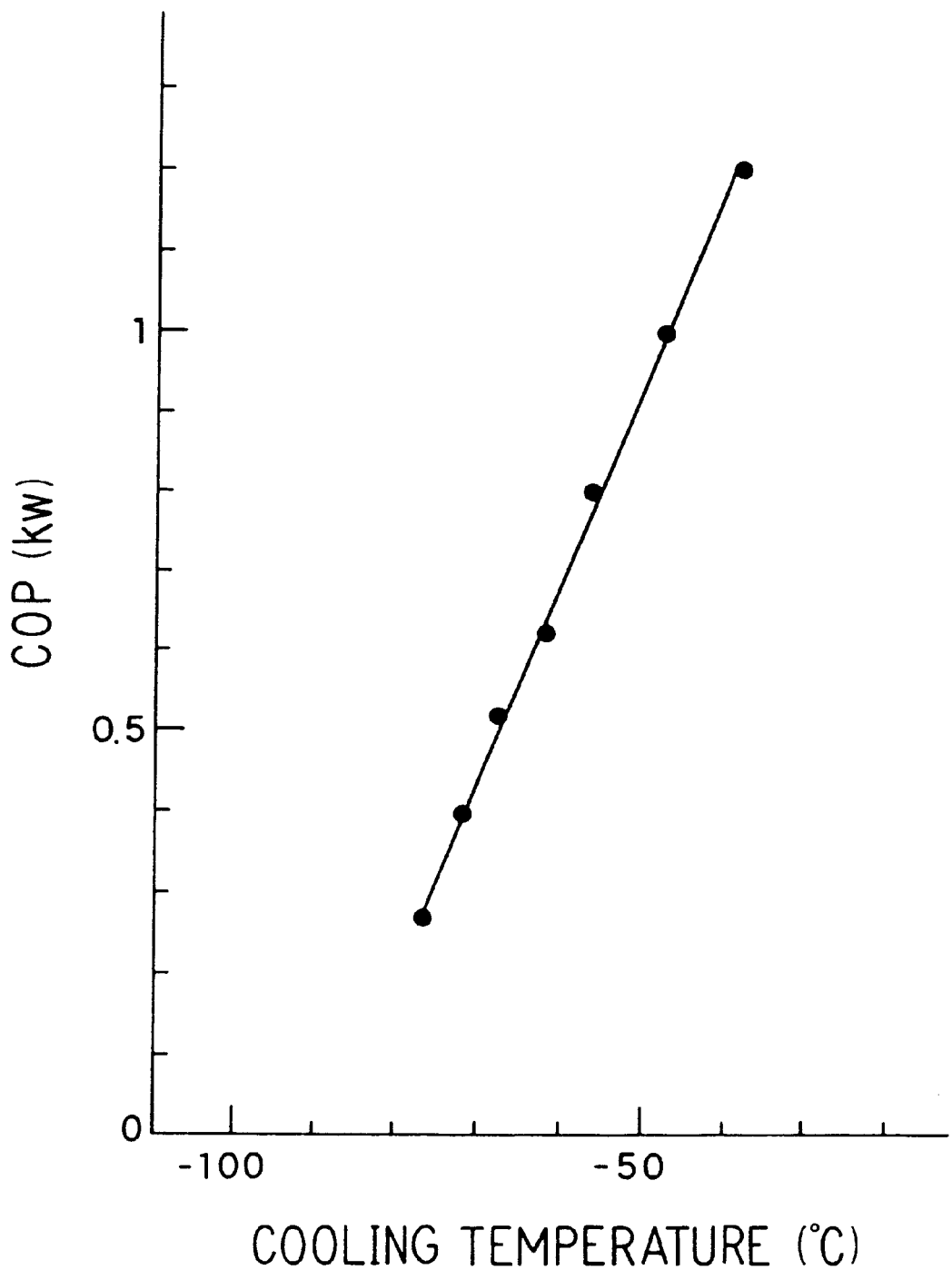
FIG. 13 is a diagram showing a relationship between a cooling temperature and a COP (coefficient of performance)

FIG. 12 is a diagram showing a relationship between a cooling time and a cooling temperature of the adsorbent, which is, for instance, silica gel, existing in the central portion of the adsorption/desorption tube having a radius of 12 cm. It can be observed that the sooner the temperature of the temperature medium is decreased to the target temperature of −60° C. (Ts1=−60° C.), and the more finely the temperature of the temperature medium is changed to approach the target temperature of −60° C. (Ts2=−66° C.→−60° C., Ts3=−72° C.→+−66° C.→−60° C., Ts4=−78° C.→−72° C.→−66° C.→−60° C.), the shorter the cooling temperature could be made. From this fact, it can be understood that it is important to decrease temperature of the temperature medium as much as possible and to change temperature of the temperature medium as finely as possible. However, as shown by relationship between cooling temperature of the temperature medium and COP (coefficient of performance; a ratio between cooling performance and an amount of consumed energy converted into heat quantity) in FIG. 13, the more the cooling temperature is decreased, the more the amount of energy required for the cooling is increased, and the more the cooling temperature is decreased, a temperature adjusting device 7 having a large cooling capacity is required to be arranged.

Therefore, though depending on the target temperature which the adsorbent is to reach at last, it is not desirable to operate the temperature adjusting device 7 with COP being not more than 0.5 in view of decreasing the amount of energy consumed in the temperature adjusting device 7.

Thus, it is preferable to set the temperature of the temperature medium to −70° C. in minimum.

Next, the temperature controlling method at the time of desorption will be explained. While the method of desorbing ozone varies depending on the method of supplying ozone, it will here be explained for a case in which temperature control is performed.

The set temperature for the temperature medium is set to a temperature which is lower than a target temperature which the adsorbent is to reach at last, that is, when the target temperature is −60° C., the set temperature is set to −70° C. which is lower than −60° C. This temperature medium is then supplied to the adsorption/desorption device 4 from the inlet 4a for the temperature medium. The temperature of the adsorbent in the proximity of the wall surface is observed by the temperature sensor 52, and when this temperature has reached the set temperature, the temperature of the temperature medium is set to approach the target temperature by units of several ° C. By repeating this operation, the temperature of the temperature medium is set to be the target temperature at last. By performing such control of temperature, the temperature of the adsorbent can be heated in a short time and abrupt desorption of ozone can be prevented.

Finally, the location for installing the temperature sensor 52 will be explained. This embodiment is so arranged, both in adsorbing process and desorbing process, as to make the temperature of the adsorbent reach the target temperature in a short time and in an energy-saving way as much as possible. Therefore, since making the temperature of the adsorbent lower than the target temperature causes problems in terms of energy at the time of adsorption, the temperature sensor 52 is preferably disposed at a location at which the temperature of the adsorbent reaches a temperature of the temperature medium at the shortest time. That is, it is preferable to dispose the temperature sensor 52 in a proximity of the inlet 4a for the temperature medium of the adsorption/desorption device and in a periphery portion of an adsorption/desorption tube which is closest to the temperature medium. Further, since the temperature of the adsorbent needs to be raised as rapidly as possible at the time of desorption, the temperature sensor 52 is preferably disposed at a location at which the temperature of the adsorbent reaches a temperature of the temperature medium at the shortest time. That is, it is preferable to dispose the temperature sensor 52 in a proximity of the inlet 4a for the temperature medium of the adsorption/desorption device and in a peripheral portion of an adsorption/desorption tube which is closest to the temperature medium, similarly to the time of performing adsorption.

It should be noted that when the plurality of adsorption/desorption tubes provided in the adsorption/desorption device 4 are all of the same shape, the temperature sensor 52 needs to be provided only at a representative adsorption/desorption tube 10. Alternatively, temperature sensors 52 might be provided to a plurality of adsorption/desorption tubes 10 for multiple control. While this arrangement has an effect of enabling precise temperature control of the adsorption/desorption tube 10, the increase in number of temperature sensors 52 and complicated control system result in a higher cost of the apparatus.

While this embodiment has been explained by taking a case in which the temperature sensor 52 is provided in the adsorption/desorption device 4 of an arrangement as explained in Embodiment 1, equivalent effects can be obtained by providing the temperature sensor 52 in the adsorption/desorption device 4 of Embodiments 2 to 4.

Embodiment 6

Figure 14:
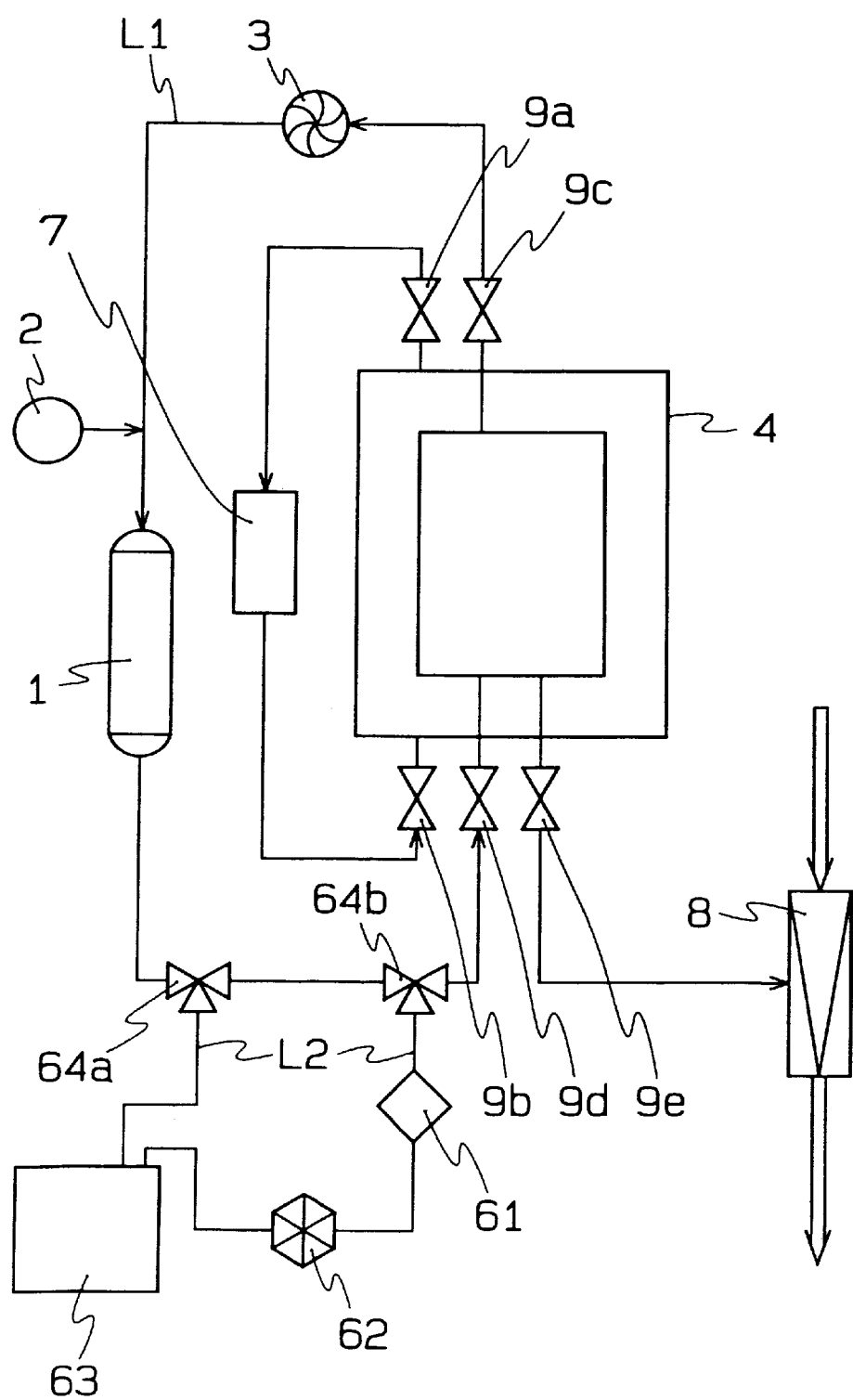
FIG. 14 is a diagram showing an arrangement of an ozone supplying apparatus according to Embodiment 6 of the present invention.
Figure 15:
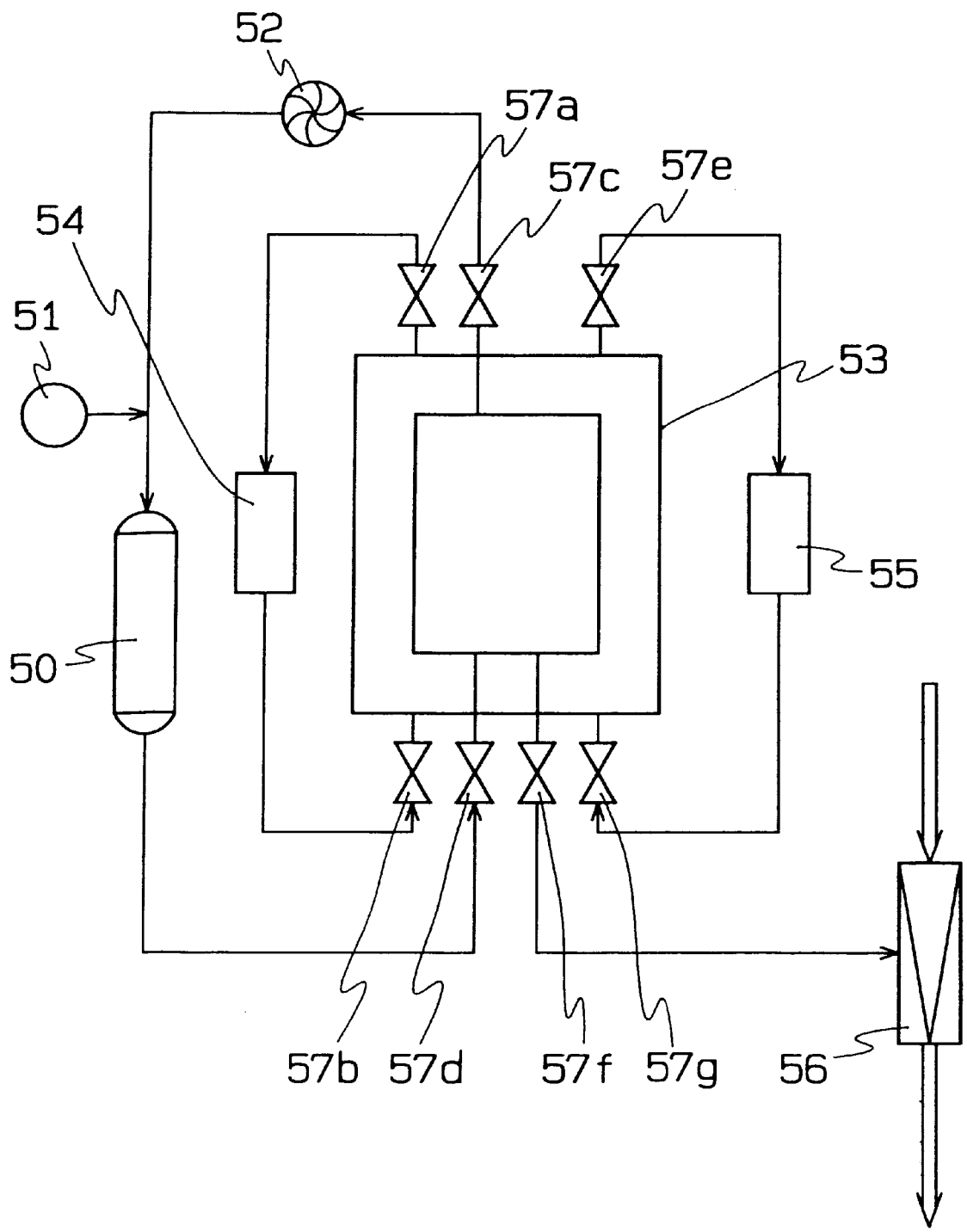
FIG. 15 is a diagram showing an arrangement of a conventional intermittent type ozone supplying apparatus.
Figure 16:
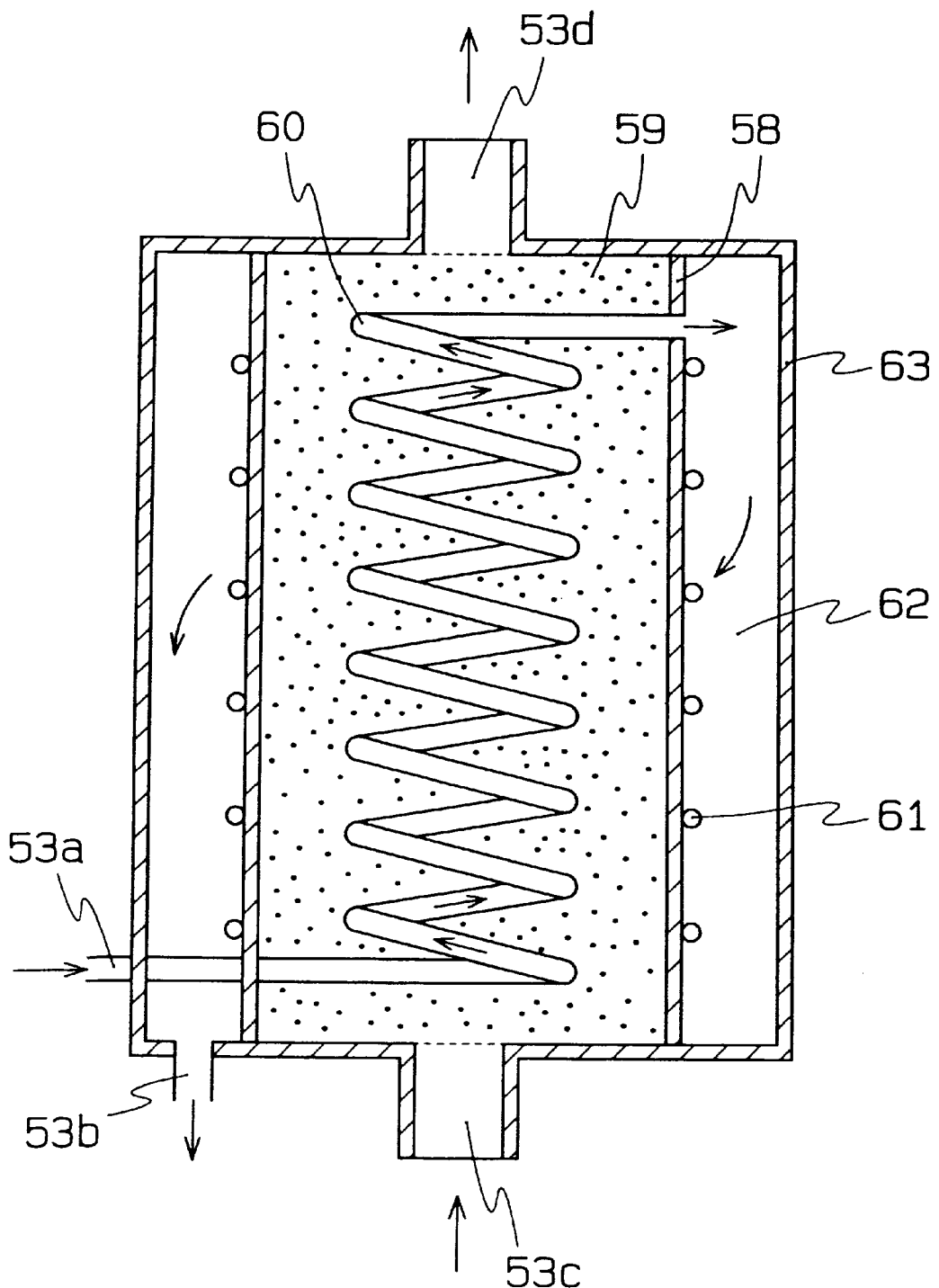
FIG. 16 is a diagram showing an arrangement of an ozone desorbing portion in a conventional intermittent type ozone supplying apparatus.

FIG. 14 is a diagram showing an ozone supplying apparatus according to Embodiment 6 of the present invention. In FIG. 14, reference numerals which are identical with those of the previous Embodiment 1 indicate identical or equivalent portions and explanations thereof will be omitted.

Numeral 61 denotes a gas aspirating means for aspirating gas from an ozone circulating line L1, 62 an oxygen refining device for refining oxygen gas to be of high purity, 63 a gas storing tank for temporarily storing refined oxygen gas therein, and 64a and 64b switch valves of a main loop (ozone circulating line L1) and a sub loop (branching line L2), respectively.

Operations will now be explained. Since ozonized oxygen supplying operation to the adsorption/desorption device 4 and ozonized oxygen discharging operation from the adsorption/desorption device 4 are identical with those of the previous Embodiment 1, explanations thereof will be omitted, and operations after completion of ozone supply from the adsorption/desorption device 4 will be explained.

When ozone desorption is completed, switch valves 9e and 64a are closed. Thereafter, the switch valve 9d is opened and the switch valve 64a is switched on. The temperature of temperature medium is further raised by the temperature adjusting device 7 to be more than temperature at the time of ozone desorption. With this arrangement, the temperature of adsorbent is raised and substances which remain adsorbed at the adsorbent start separation. At this time, the gas aspirating means 61 starts operation and remaining substances in the adsorption/desorption device 4 are aspirated to the oxygen refining device 62. Oxygen gas which has been refined by the oxygen refining device 62 is then sent to the gas storing tank 63. Oxygen which is stored in the gas storing tank 63 is used when the adsorbing operation is again performed.

With this arrangement, substances which are adsorbed at the adsorbent and badly affect adsorption of ozone can be removed, whereby ozone can be efficiently stored. Further, oxygen remaining at the adsorbent can be reused to decrease an amount of used oxygen.

While this embodiment has been explained by taking a case in which the oxygen refining device 62 is disposed between the gas aspirating device 61 and gas storing tank 63, the oxygen refining device 62 might be omitted and only reuse of oxygen might be performed.

Embodiment 7

While Embodiments 1 to 6 have been explained by taking a case in which the adsorbent is of grain type, integrated type silica gel corresponding to the internal shape of the adsorption/desorption tubes 10, conical adsorption/desorption tubes 20 or inner cylinder 32 might also be used.

A method for manufacturing integrated type silica gel will now be explained. Sodium borosilicate type glass is molded to be of a shape of the interior of the adsorption/desorption tubes 10 and is gradually cooled at a temperature which is not more than a melting point. After treating with strong acid, a boron oxide phase thereof dissolves so that an integrated type and porous silica gel (porous body) can be manufactured.

With this arrangement, the adsorbent can be made integrated without decreasing adsorption efficiency of ozone, and exchange of adsorbent can be easily performed.

According to the ozone supplying apparatus according to the present invention, the adsorption/desorption device includes at least one ozone storing portion filled with an adsorbent, and a liquid storing portion for filling a temperature medium to an outer peripheral surface of the ozone storing portion, whereby the ozone adsorbing portion can be cooled in a short time, ozone can be effectively stored and the adsorption/desorption device can be made compact.

When the ozone storing portion is arranged to be in the liquid storing portion, the ozone adsorbing portion can be cooled in a short time, ozone can be effectively stored and the adsorption/desorption device can be made compact.

When the ozone storing portion is made in a form of a pipe which is either of cylindrical or of conical shape, the ozone adsorbing portion can be cooled in a short time, ozone can be effectively stored and the adsorption/desorption device can be made compact.

When the apparatus further includes an ozonized oxygen channel in which a distance for ozonized oxygen to flow in the ozone storing portion is longer than an average distance between a central point of the ozone storing portion and a surface thereof at the time of adsorbing ozone, and a distance for ozonized oxygen to flow in the ozone storing portion is shorter than the average distance between the central point of the ozone storing portion and the surface thereof, ozone can be effectively stored and the loss amount of ozone at the time of adsorption and desorption can be decreased.

When the adsorbent to be filled into the ozone storing portion is of an integrated type corresponding to a shape of the ozone storing portion and is of porous material, maintenance such as exchange of ozone adsorbent can be easily performed.

When the adsorption/desorption device is disposed in a gas charging vessel for charging gas therein and a pressure adjusting means is provided for adjusting a gas pressure in the gas inclusion vessel, the amount of electricity consumed at the time of storing ozone can be decreased, desorption of ozone can be rapidly performed and arrangement of the ozone storing portion can be simplified.

When the gas pressure in the gas charging vessel is made to be vacuum at the time of storing ozone, the amount of electricity consumed at the time of storing ozone can be decreased.

When a branching line is formed in an ozone circulating line provided between the ozone generator and the adsorption/desorption device, and the branching line is connected to a gas aspirating means for aspirating gas in the adsorption/desorption device and a gas storing tank for temporarily storing gas therein, substances which badly affect ozone at the time of desorption can be removed and ozone can be efficiently stored. Further, oxygen remaining at the adsorbent can be reused and the amount of used oxygen is decreased.

When an oxygen refining device is provided between the gas aspirating device and the gas storing tank, oxygen remaining at the adsorbent can be reused and the amount of used oxygen is decreased.

When the apparatus further includes a temperature adjusting device for adjusting temperature in the adsorption/desorption device and a temperature measuring device for measuring a temperature in the adsorption/desorption device, desorption of ozone can be performed in a short time and the amount of electricity consumed at the time of adsorbing and storing ozone can be decreased.

When the adsorption/desorption device is heated by the temperature adjusting device after completion of ozone desorption, ozone storing efficiency of the adsorbent can be maintained and the amount of used oxygen is decreased.

What is claimed is:

1. An ozone supplying apparatus comprising an ozone generator for generating ozonized oxygen from raw material oxygen, an adsorption/desorption device for adsorbing and storing ozone from ozonized oxygen and desorbing the ozone, and an ozone desorbing means for desorbing the adsorbed and stored ozone for supply, the apparatus being arranged to return oxygen to the ozone generator after desorbing ozone therefrom by the adsorption/desorption device, and to desorb and supply ozone from the adsorption/desorption device, wherein the adsorption/desorption device includes a chamber housing a plurality of ozone storing cylinders filled with an adsorbent, and a liquid storing portion for filling a temperature medium to an outer peripheral surface of the plurality of ozone storing cylinders.

2. The apparatus of claim 1, wherein the inside diameter of each of the plurality of ozone storing cylinders is not more than 24 cm.

3. The apparatus of claim 2, wherein the plurality of ozone storing cylinders are arranged in a series relationship.

4. The apparatus of claim 2, wherein the apparatus further includes an ozonized oxygen channel extending within at least one of the ozone storing cylinders and operatively configured between a closed position actuated during an adsorption cycle and an open position actuated during a desorption cycle such that ozonized oxygen travels within the at least one of the ozone storing cylinders an average distance during the adsorption cycle that is greater than an average distance traveled by the ozonized oxygen within the at least one of the ozone storing cylinders during the desorption cycle.

5. The apparatus of claim 1, wherein the inside diameter of each of the plurality of ozone storing cylinders is from 10 cm to 20 cm.

6. The apparatus of claim 1, wherein the apparatus further includes a temperature adjusting device for adjusting temperature in the adsorption/desorption device and a plurality of temperature measuring devices configured to measuring a temperature of the adsorbent in the plurality of ozone storing portions.

7. The apparatus of claim 1, wherein an adsorbent to be filled into the plurality of ozone storing cylinders is of an integrated type corresponding to a shape of the plurality of ozone storing cylinders and is of porous material.

* * * * *